United States Patent
Lim et al.

(10) Patent No.: US 8,774,101 B2
(45) Date of Patent: Jul. 8, 2014

(54) APPARATUS AND METHOD FOR FRAME STRUCTURE IN WIDE-BAND WIRELESS COMMUNICATION SYSTEM

(75) Inventors: Chi-Woo Lim, Suwon-si (KR); Seung-Hoon Park, Seoul (KR); Mi-Hyun Lee, Seoul (KR); Ki-Chun Cho, Suwon-si (KR); Dong-Seek Park, Yongin-si (KR); Ho-Kyu Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 594 days.

(21) Appl. No.: 11/999,233

(22) Filed: Dec. 4, 2007

(65) Prior Publication Data
US 2008/0130486 A1 Jun. 5, 2008

(30) Foreign Application Priority Data
Dec. 4, 2006 (KR) ........................ 10-2006-0121346

(51) Int. Cl.
*H04W 4/00* (2009.01)
(52) U.S. Cl.
USPC .......................................... 370/329
(58) Field of Classification Search
USPC ......... 370/465, 469, 470, 474, 203, 331, 370; 370/329; 375/260, 130; 704/205; 455/67.11, 553.1
See application file for complete search history.

(56) References Cited

U.S. PATENT DOCUMENTS

| | | | |
|---|---|---|---|
| 5,022,046 A * | 6/1991 | Morrow, Jr. | 375/130 |
| 5,640,385 A | 6/1997 | Long et al. | |
| 6,212,173 B1 * | 4/2001 | Lindsay et al. | 370/331 |
| 2001/0050966 A1 | 12/2001 | Signell et al. | |
| 2004/0224719 A1 * | 11/2004 | Nounin et al. | 455/553.1 |
| 2005/0181752 A1 | 8/2005 | Sahota | |
| 2005/0201476 A1 * | 9/2005 | Kim et al. | 375/260 |
| 2006/0077931 A1 * | 4/2006 | Lee et al. | 370/329 |
| 2006/0250935 A1 * | 11/2006 | Hamamoto et al. | 370/203 |
| 2007/0026810 A1 * | 2/2007 | Love et al. | 455/67.11 |
| 2007/0217362 A1 * | 9/2007 | Kashima et al. | 370/330 |
| 2008/0027715 A1 * | 1/2008 | Rajendran et al. | 704/205 |

FOREIGN PATENT DOCUMENTS

| | | |
|---|---|---|
| KR | 10-1999-0087447 | 12/1999 |
| WO | WO 97/32403 | 9/1997 |
| WO | WO 2004077712 A1 * | 9/2004 |

OTHER PUBLICATIONS

Zhang et al., WIPO Publication 2005/099290.*

* cited by examiner

*Primary Examiner* — Mark Rinehart
*Assistant Examiner* — Gbemileke Onamuti

(57) ABSTRACT

An apparatus and method for maintaining backward compatibility with a narrow-band wireless communication system in a wide-band wireless communication system is provided. The base station comprises a scheduler, a control information generator, a resource mapping unit and a transmitter. The terminal comprises a resource allocation information checking unit, a receiver and a transmitter.

25 Claims, 6 Drawing Sheets

APPARATUS AND METHOD FOR FRAME STRUCTURE IN WIDE-BAND WIRELESS COMMUNICATION SYSTEM

CROSS-REFERENCE TO RELATED APPLICATION(S) AND CLAIM OF PRIORITY

This application claims the benefit under 35 U.S.C. §119(a) to a Korean patent application filed in the Korean Intellectual Property Office on Dec. 4, 2006 and assigned Serial No. 2006-121346, the entire disclosure of which is hereby incorporated by reference.

TECHNICAL FIELD OF THE INVENTION

The present invention relates generally to an apparatus and method for frame structure in a wide-band wireless communication system, and more particularly to an apparatus and method for frame structure supporting backward compatibility with a narrow-band wireless communication system in the wide-band wireless communication system.

BACKGROUND OF THE INVENTION

Many wireless communication technologies have been proposed for high-speed mobile communications over the recent years. Among them, an Orthogonal Frequency Division Multiple Access (OFDMA) technique is recognized as the most influential technology for next generation wireless communications. The OFDMA technique is currently under standardization in the working group of IEEE (Institute of Electrical and Electronics Engineers) 802.16e.

The OFDMA wireless communication system has downlink and uplink frames using the frequency-time resources so that a receiving end can effectively receive digital bit information transmitted from a transmitting end. In this case, the wireless communication system allocates frame resources for the receiving end and the transmitting end using a sub-channel allocation technique. There are two kinds of sub-channel allocation technique: one is a diversity sub-channel allocation technique, such as a full usage sub-carrier (FUSC) technique or a partial usage sub-carrier (PUSC) technique, and the other is an adaptive modulation and coding (AMC) sub-channel allocation technique.

As afore-mentioned, the OFDMA wireless communication system allocates frame resources for the receiving end and the transmitting end using the sub-channel allocation technique. The receiving end and the transmitting end are provided with resource information allocated from an upper node through control information contained in the frame. Accordingly, there arises a problem that the greater the degree of freedom is of the resources allocated to the receiving and transmitting ends, the more the overhead of control information contained in the frame increases.

The typical OFDMA wireless communication system under standardization in the working group of IEEE 802.16e utilizes one narrow-band frequency. However, with the recent increase of demand on multi-media services, research studies are being actively conducted on wide-band wireless communication systems which employ a plurality of frequency bands for faster data transmission. In this case, there occurs a problem that overhead is significantly increased due to the control information for the plurality of frequency bands used in the wide-band wireless communication system. In addition, there is a requirement to maintain backward compatibility with the narrow-band wireless communication system while employing the wide-band wireless communication system.

SUMMARY OF THE INVENTION

To address the above-discussed deficiencies of the prior art, it is a primary object aspect of the present invention to provide an apparatus and method for maintaining backward compatibility with a narrow-band wireless communication system in a wide-band wireless communication system.

Another aspect of the present invention is to provide an apparatus and method for frame structure for maintaining backward compatibility with the narrow-band wireless communication system in the wide-band wireless communication system.

Still another aspect of the present invention is to provide an apparatus and method for frame structure for reducing overhead of control information in the wide-band wireless communication system.

According to one aspect of the present invention, an operating method of a base station in a wide-band wireless communication system using at least two frequency bands, comprises the steps of generating common control information which is to be commonly applied to terminals providing services, resource allocation information of a narrow-band wireless communication system which uses a first frequency band among the frequency bands used in the wide-band wireless communication system, and resource allocation information of the wide-band wireless communication system; selecting a second frequency band which is to contain the resource allocation information of the wide-band wireless communication system among the frequency bands used in the wide-band wireless communication system; generating a frame of the first frequency band which contains the common control information, the resource allocation information of the narrow-band wireless communication system and the second frequency band information; and generating a frame of the second frequency band which contains the resource allocation information of the wide-band wireless communication system.

According to another aspect of the present invention, an operating method of a terminal in the wide-band wireless communication system using at least two frequency bands comprises the steps of checking common control information from a signal received through a first frequency band used by the narrow-band wireless communication system among the frequency bands used in the wide-band wireless communication system; checking from the received signal, second frequency band information which includes resource allocation information of the terminals which are provided with services of the wide-band wireless communication system; and checking the resource allocation information of the terminals from a signal received through the second frequency band.

According to still another aspect of the present invention, a base station of the wide-band wireless communication system using at least two frequency bands comprises a scheduler for allocating resources of the frequency bands to terminals providing services; a control information generator for generating first resource allocation information for terminals which are provided with services of the narrow-band wireless communication system using a first frequency band, second resource allocation information for terminals which are provided with services of the wide-band wireless communication system and common control information, by using the resource allocation information; a resource mapping unit for mapping the common control information, the first resource allocation information and second frequency band information which mapped the second resource allocation information, to the resource of the first frequency band, and mapping the second resource allocation information to the resource of the second frequency band; and a transmitter for transmitting the resource mapped signal.

According to the fourth aspect of the present invention, a terminal of the wide-band wireless communication system using at least two frequency bands comprises a resource allocation information checking unit for checking common control information from a signal received through a first frequency band used by the narrow-band wireless communication system among the frequency bands used in the wide-band wireless communication system, and checking resource allocation information from a second frequency band which includes resource allocation information of terminals which are provided with services of the wide-band wireless communication system among the frequency bands; a receiver for receiving a signal by use of the common control information and the resource allocation information; and a transmitter for transmitting a signal by use of the common control information and the resource allocation information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A preferred embodiment of the present invention will be described in detail with reference to the accompanying drawings. In addition, detailed descriptions on the well-known functions and configurations will be omitted for clarity and conciseness.

Herein, an in-depth description will be made on a technology for maintaining backward compatibility with a narrow-band wireless communication system using one frequency band in a wide-band wireless communication system using at least two frequency bands.

A description of TDD (Time Division Duplex) and OFDMA (Orthogonal Frequency Division Multiple Access) wide-band wireless communication systems is given as an example. In this case, it is assumed that the wide-band wireless communication system uses two frequency bands. Here, a first frequency band among the two frequency bands used by the wide-band wireless communication system refers to the frequency band used by both the narrow-band wireless communication system and the wide-band wireless communication system, while a second frequency band denotes the frequency band used by only the wide-band wireless communication system. The first and second frequency bands may or may not be continuously adjacent (i.e., contiguous) frequencies.

It is also assumed that the narrow-band wireless communication system employs the frame structure defined in the IEEE 802.16 standard. Accordingly, it is assumed that a frame of the first frequency band has a configuration similar to IEEE 802.16 standard.

Figure 1:
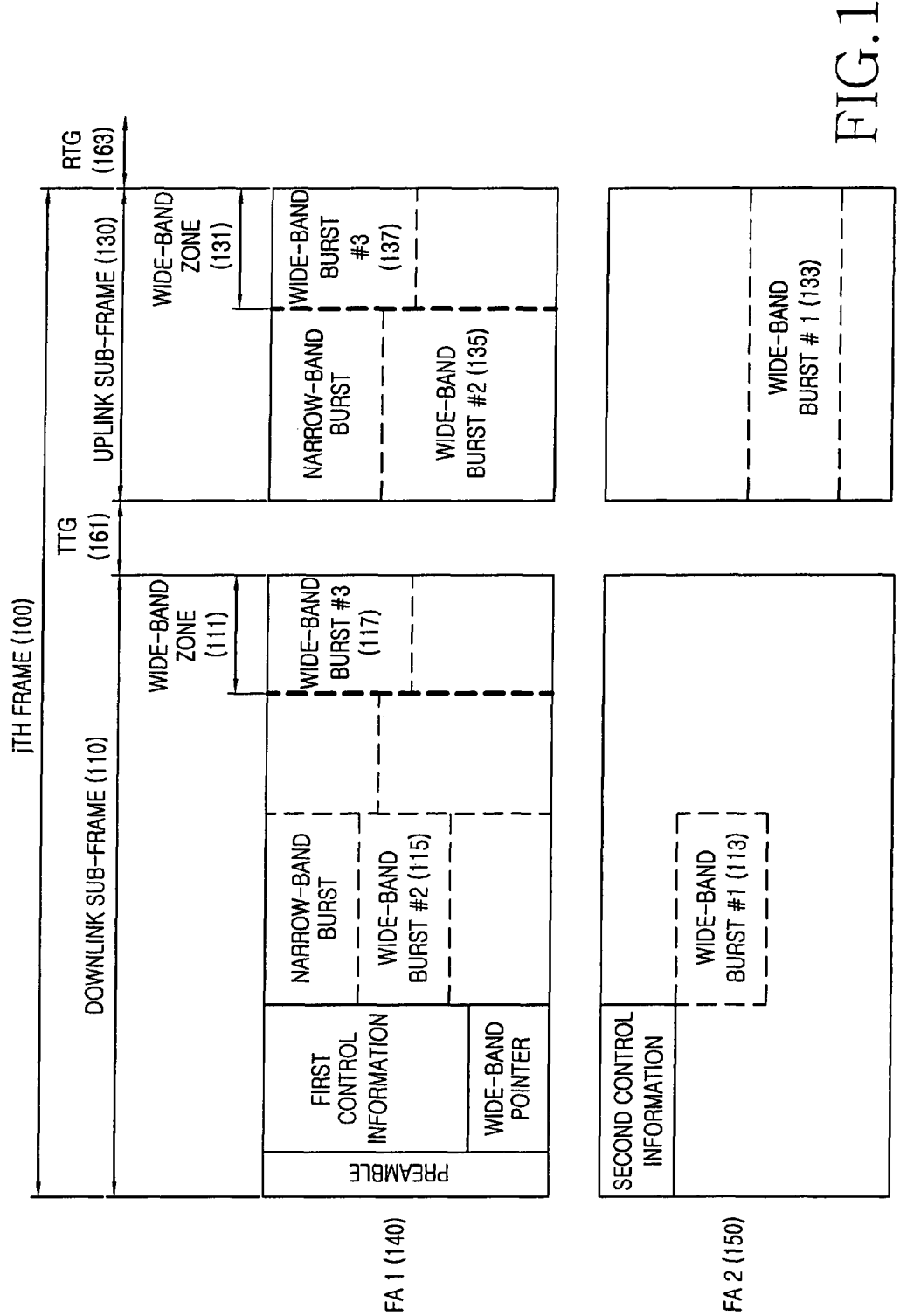
FIG. 1 is a diagram illustrating a frame structure of a wide-band wireless communication system according to an exemplary embodiment of the present invention.

The wide-band wireless communication system has a frame structure as shown in FIG. 1 in order to maintain backward compatibility with the narrow-band wireless communication system. Hereinafter, a terminal supporting the wide-band wireless communication system will be referred to as a wide-band terminal, and a terminal supporting the narrow-band wireless communication system will be referred to as a narrow-band terminal.

FIG. 1 is a diagram illustrating a frame structure of the wide-band wireless communication system according to an exemplary embodiment of the present invention. In the following description, detailed configuration of a second frequency band frame 150 will be omitted, since an improved technology with new functions and usages can be applied thereto.

As shown in FIG. 1, the frame 100 is divided into a downlink sub-frame 110 and an uplink sub-frame 130. There exists a TTG (Transmit/Receive Transition Gap) 161 which is a time guard region between the downlink sub-frame 110 and the uplink sub-frame 130. In addition, there exists an RTG (Receive/Transmit Transition Gap) which is a time guard region between the jth frame 100 and a (j+1)th frame.

The downlink sub-frame 110 of the first frequency band frame 140 is comprised of a synchronous channel (for example, a preamble), first control information, a wide-band pointer and a downlink burst. The first control information includes resource allocation information of the narrow-band wireless communication system and the common control information of the narrow-band wireless communication system and wide-band wireless communication system. Here, the common control information includes such information as a length of the frame, an up/down ratio, a TTG/RTG value and a cyclic prefix (CP) length. In addition, the first control information can have a configuration identical to IEEE 802.16 standard, including a frame control header and an up/downlink MAP.

The resource allocation information of the uplink sub-frame (that is, uplink MAP) contained in the first control information may include resource allocation information of the uplink sub-frame 130 of the jth frame 100 or resource allocation information of an uplink sub-frame of the (j+1)th frame.

The wide-band pointer includes frequency band information containing second control information for the wide-band terminal.

The downlink burst is comprised of a narrow-band burst allocated to the narrow-band terminal and a wide-band burst allocated to the wide-band terminal.

The uplink sub-frame 130 of the first frequency band frame 140 includes the narrow-band burst allocated to the narrow-band terminal and the wide-band burst allocated to the wide-band terminal.

The downlink sub-frame 110 of the second frequency band frame 150 includes second control information and the downlink burst. Here, the second control information contains resource allocation information of the wide-band wireless communication system. That is to say, the second control information includes the resource allocation information of the wide-band wireless communication system allocated to the first frequency band as well as to the second frequency band. Accordingly, the wide-band terminal checks the resource information allocated to the first frequency band or the second frequency band through the second control information.

The uplink sub-frame 130 of the second frequency band frame 150 includes the wide-band burst allocated to the wide-band terminal.

As described above, the wide-band terminal checks resource allocation information allocated thereto through the second control information. For example, the wide-band terminal is allocated with any one resource of the wide-band bursts #1 113 and 133, the wide-band bursts #2 115 and 135, and the wide-band bursts #3 117 and 137 through the second control information.

First, the wide-band bursts #1 113 and 133 which are allocated to the second frequency band frame 150, may use sub-channel structure and allocating method different from those of the narrow-band wireless communication system.

Next, the wide-band bursts #2 115 and 135 refer to a burst which is divided from the narrow-band burst in the first frequency band frame 140 by a frequency division multiplexing method. In this case, the wide-band bursts #2 115 and 135 have a sub-channel structure identical to that of the narrow-band wireless communication system. If the wide-band bursts #2 115 and 135 have a different sub-channel structure from the narrow-band wireless communication system, the terminal of the wide-band wireless communication system must be able to identify the sub-channel structure of each frequency band.

Lastly, the wide-band bursts #3 117 and 137 denote a burst which is divided from the narrow-band burst in the first frequency band frame 140 by a time division multiplexing method. In other words, the wide-band bursts #3 117 and 137 can use a sub-channel structure and an allocating method different from those of the narrow-band wireless communication system, since the wide-band bursts #3 117 and 137 divide the wide-band zones 111 and 131 in the first frequency band frame 140. Here, the wide-band bursts #3 117 and 137 need a zone indicator for dividing the wide-band zones 111 and 131.

Figure 2:
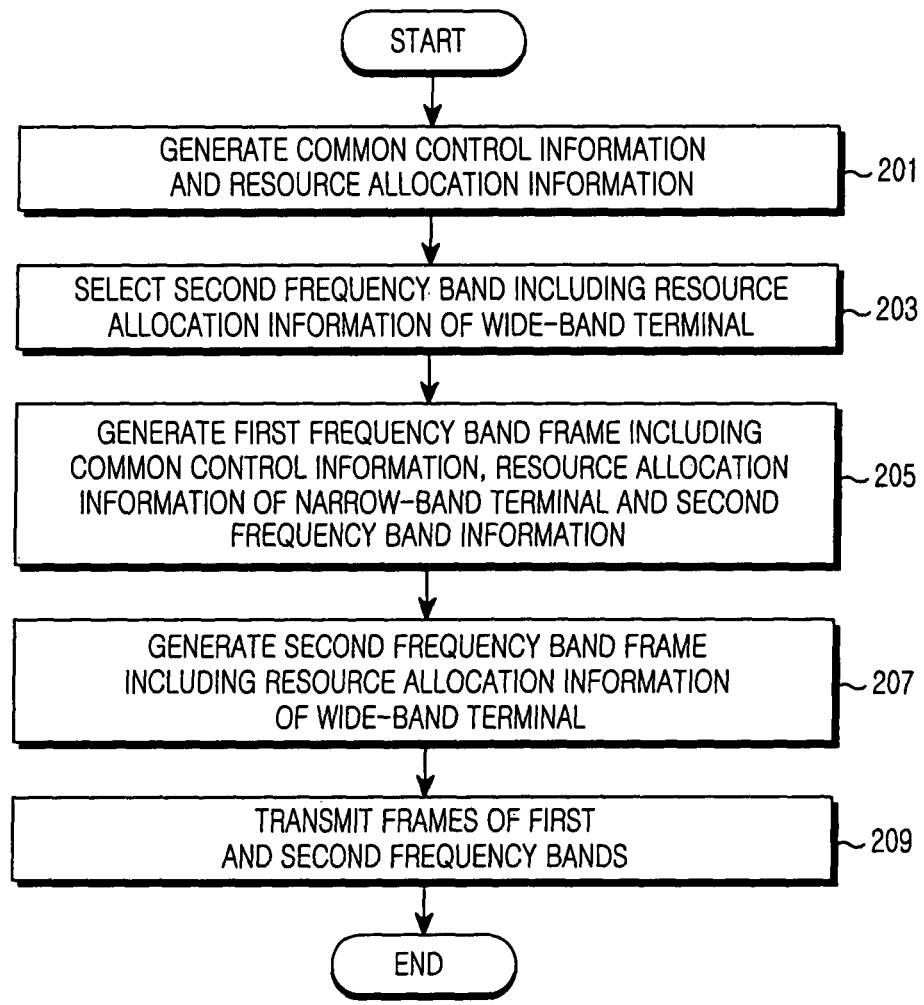
FIG. 2 is a diagram illustrating an operating procedure of a base station in the wide-band wireless communication system according to an exemplary embodiment of the present invention.

In the case of using the frame configured as described above, the base station of the wide-band wireless communication system operates as shown in FIG. 2.

FIG. 2 is a diagram illustrating an operating procedure of the base station in the wide-band wireless communication system according to an exemplary embodiment of the present invention.

Referring to FIG. 2, in step 201, the base station generates the common control information and the resource allocation information which are to be supplied to the terminals providing services. For example, if the terminals are narrow-band terminals, the base station generates the resource allocation information of the narrow-band terminal allocated to the first frequency band. If the terminals are wide-band terminals, the base station generates the resource allocation information of the wide-band terminal allocated to the first frequency band or the second frequency band. Here, the common control information refers to the control information commonly contained in the narrow-band terminal and the wide-band terminal, including such information as a length of frame, an up/down ratio, a TTG/RTG value, and a CP length.

After generating the common control information and the resource allocation information, the base station proceeds to step 203 and selects a frequency band (for example, a second frequency band) which is to include the resource allocation information for the wide-band terminal among a plurality of frequency bands operated in the wide-band wireless communication system. That is, the base station selects the second frequency band which is to be used by the wide-band terminal except the first frequency band among the plurality of frequency bands operated in the wide-band wireless communication system.

After selecting the second frequency band, the base station proceeds to step 205 and generates a first frequency band frame containing the common control information, the resource allocation information of the narrow-band terminal and the second frequency band information. Here, the second frequency band information refers to a wide-band pointer displaying the second frequency band including the resource allocation information for the wide-band terminal.

Then, the base station proceeds to step 207 and generates a second frequency band frame including the resource allocation information of the wide-band terminal.

After generating the first and second frequency band frames, the base station transmits the frames to the terminals.

Thereafter, the base station completes this algorithm.

Figure 3:
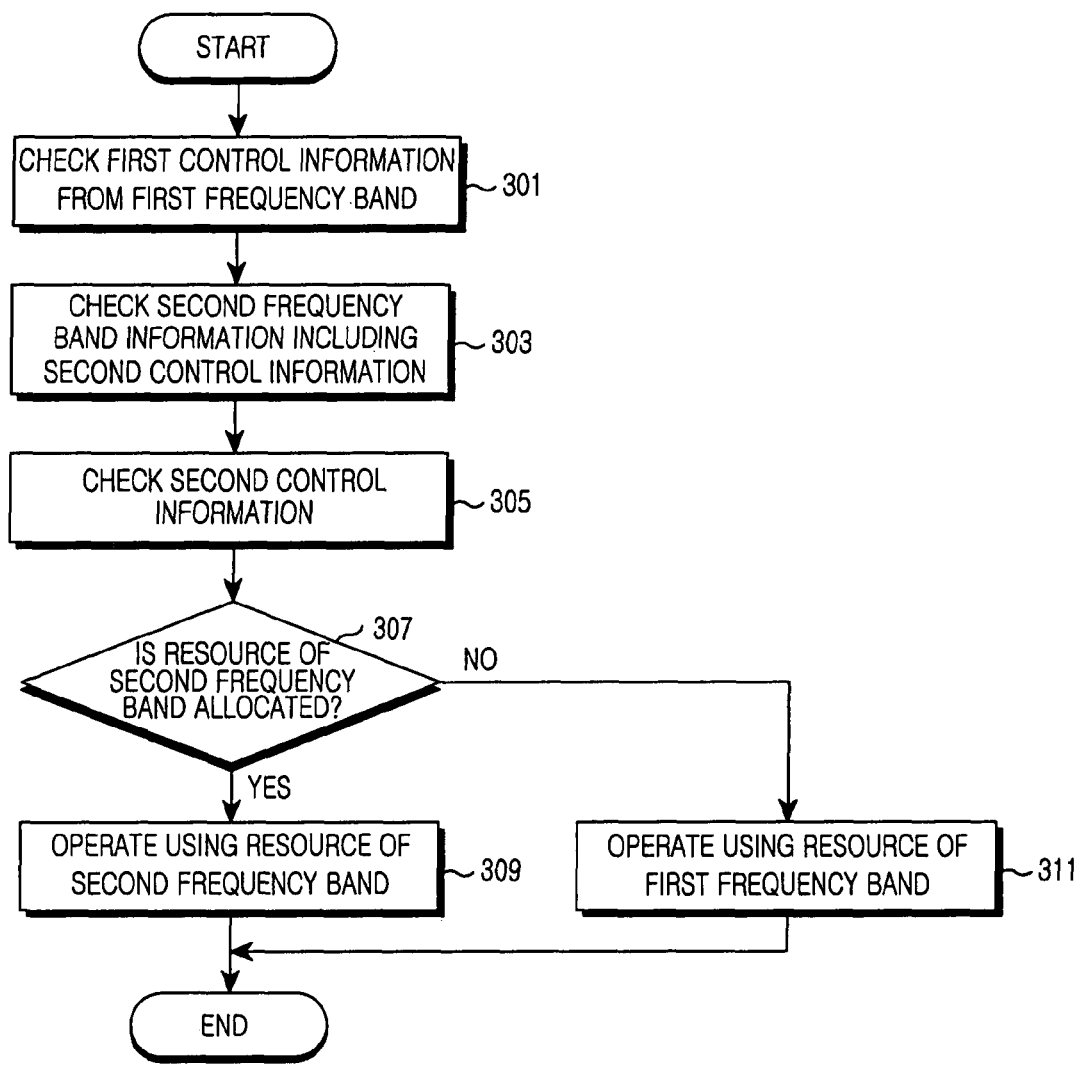
FIG. 3 is a diagram illustrating an operating procedure of a terminal in the wide-band wireless communication system according to an exemplary embodiment of the present invention.

In the case that the base station structures and transmits the frames as afore-mentioned, the terminal of the frames in the wide-band wireless communication system operates as shown in FIG. 3.

FIG. 3 is a diagram illustrating an operating procedure of the terminal in the wide-band wireless communication system according to an exemplary embodiment of the present invention. Herein, the operating procedure of the wide-band terminal is given.

Referring to FIG. 3, the terminal checks in step 301 the common control information from first control information received through the first frequency band. Here, the common control information includes such information as a length of frame, an up/down ratio, a TTG/RTG value and a CP length.

After checking the common control information, the terminal proceeds to step 303 and checks the wide-band pointer included in the first frequency band to check a frequency band (for example, the second frequency band) including second control information. For example, in the case that the frame is structured as shown in FIG. 1, the terminal checks the second frequency band including the second control information using the wide-band pointer.

After checking the frequency band including the second control information, the terminal proceeds to step 305 and checks the resource information allocated from the base station through the second control information contained in the second frequency band. In this case, since the terminal obtained synchronization through a synchronous channel of the first frequency band, the second frequency band does not need to include the synchronous channel. However, the second frequency band may include an additional synchronous channel separate from the first frequency band.

Then, the terminal proceeds to step 307 and checks if the resource allocated thereto is contained in the second frequency band.

If the resource allocated to the terminal exists in the second frequency band, the terminal proceeds to step 309 and performs a communication using the resource zone allocated to the second frequency band.

In the meantime, if the resource allocated to the terminal exists in the first frequency band, the terminal proceeds to step 311 and performs a communication using the resource zone allocated to the first frequency band.

Thereafter, the terminal completes this algorithm.

Figure 4:
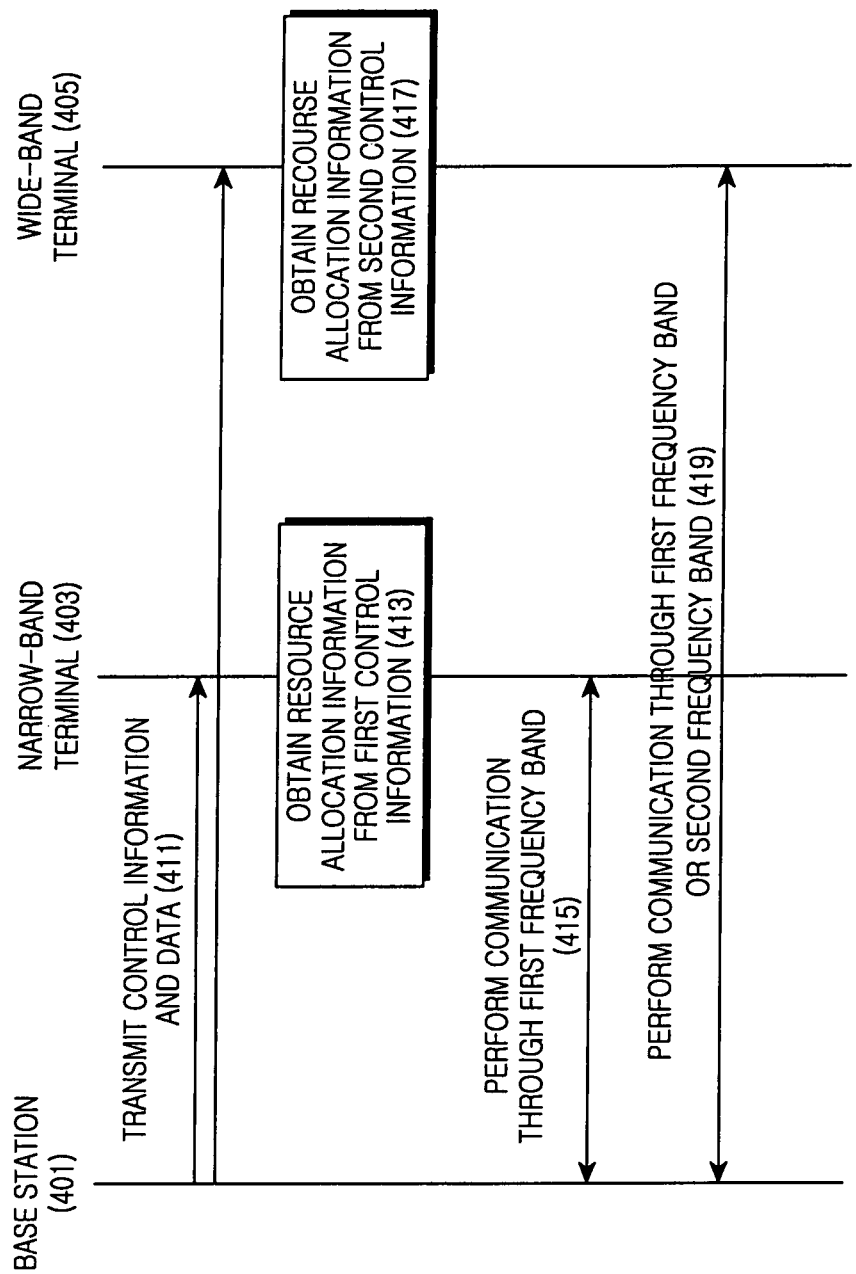
FIG. 4 is a diagram illustrating a communicating procedure of the wide-band wireless communication system according to an exemplary embodiment of the present invention.

FIG. 4 is a diagram illustrating a communicating procedure of the wide-band wireless communication system according to an exemplary embodiment of the present invention.

As shown in FIG. 4, the base station 401 transmits in step 411 a first frequency band signal including the common control information and the resource allocation information of the narrow-band terminal 403, and a second frequency band signal including the resource allocation information of the wide-band terminal 405. Here, the common control information and the resource allocation information of the narrow-band terminal 403 included in the first frequency band signal are referred to as first control information, whereas the resource allocation information of the wide-band terminal 405 included in the second frequency band signal is referred to as second control information.

In step 413, the narrow-band terminal 403 checks the common control information and the resource allocation information through the first control information supplied from the base station 401. In step 415, the narrow-band terminal 403 performs a communication with the base station 401 using the common control information and the resource zone of the first frequency band allocated through the resource allocation information.

The wide-band terminal 405 checks the wide-band pointer displaying the second frequency band which includes the resource allocation information of the wide-band terminal 405 and the common control information through the first control information supplied from the base station 401. Thereafter, the wide-band terminal 405 checks in step 417 the resource allocation information through the second control information included in the second frequency band which was checked via the wide-band pointer.

After checking the resource allocation information, the wide-band terminal 405 performs a communication in step 419 with the base station 401 using the common control information and the resource zone of the first frequency band or of the second frequency band allocated through the second control information. For example, if the resource of the first frequency band is allocated according to the resource allocation information, the wide-band terminal 405 performs a communication with the base station 401 using the first frequency band. On the contrary, if the resource of the second frequency band is allocated according to the resource allocation information, the wide-band terminal 405 performs a communication with the base station 401 using the second frequency band.

Hereinafter, description will be made on a block configuration of the base station for performing a communication using the frame of FIG. 1 in the wide-band wireless communication system.

Figure 5:
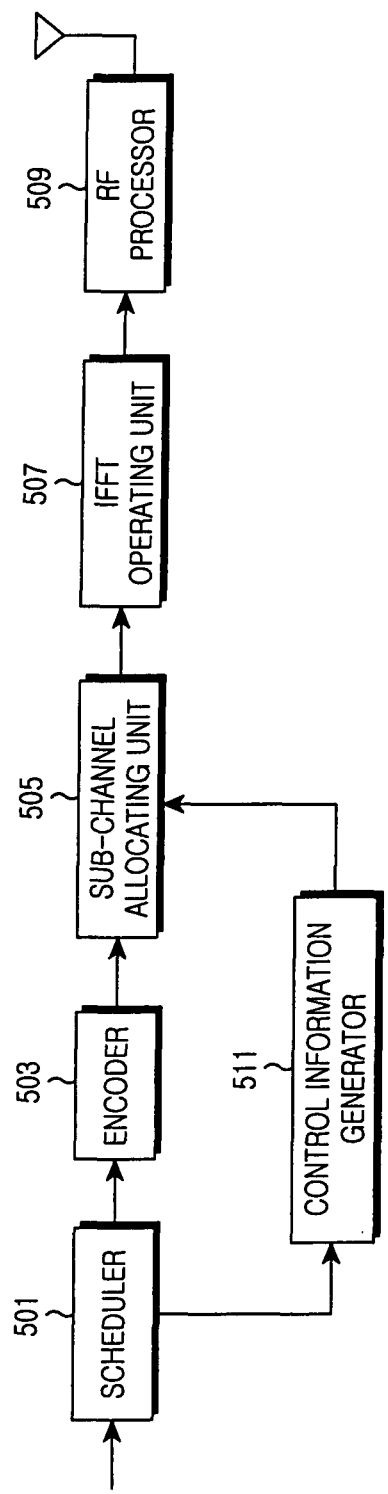
FIG. 5 is a block diagram illustrating a configuration of a base station in the wide-band wireless communication system according to the present invention.

FIG. 5 is a block diagram illustrating a configuration of the base station in the wide-band wireless communication system according to the present invention.

As shown in FIG. 5, the base station has a scheduler 501, an encoder 503, a sub-channel allocating unit 505, an IFFT operating unit 507, an RF processor 509 and a control information generator 511.

First, the scheduler 501 performs a scheduling for terminals which are to supply services according to the scheduling information for the terminals placed within a service zone. Here, the scheduling information includes a QoS (Quality of Service) of the terminals placed within the service zone or channel state information.

For instance, the scheduler 501 selects a frequency band (for example, the second frequency band) to be allocated to the wide-band terminal among a plurality of frequency bands operated in the wide-band wireless communication system. In addition, the scheduler 501 selects terminals which are to supply services among the terminals placed within the service zone. In the case that the narrow-band terminal and the wide-band terminal are selected, the scheduler 501 determines the resource to be allocated to the narrow-band terminal from the first frequency band, and the resource to be allocated to the wide-band terminal from the first frequency band or the second frequency band.

The encoder 503 encodes and modulates data supplied from the scheduler 501 according to corresponding modulation and coding scheme (MCS) level and then outputs the encoded and modulated data.

The control information generator 511 generates the first and second control information and the wide-band pointer information showing the second frequency band according to the scheduling information supplied from the scheduler 501. That is, the control information generator 511 generates the first control information including the common control information and the resource allocation information of the narrow-band terminal and the wide-band pointer by use of the scheduling information supplied from the scheduler 501. Furthermore, the control information generator 511 generates the second control information including the resource allocation information of the wide-band terminal. Here, the wide-band pointer information includes information on the frequency band contained in the second control information of the wide-band terminal among a plurality of frequency bands operated by the wide-band wireless communication system.

The sub-channel allocating unit 505 maps the data supplied from the encoder 503 and the control information supplied from the control information generator 511 to the wireless resource (sub-channel) according to the resource allocation information and then outputs them. For example, the sub-channel allocating unit 505 maps the first control information and the wide-band pointer information to the wireless resource of the first frequency band, and maps the second control information to the wireless resource of the second frequency band.

The IFFT operating unit 507 inverse fast-Fourier-transforms a frequency zone signal supplied from the sub-channel allocating unit 505 into a time zone signal. Here, if the first frequency band and the second frequency band are continuously adjacent to each other, the IFFT operating unit 507 employs a wide-band IFFT operating unit for inverse fast-Fourier-transforming the first and second frequency bands at a time. In this case, the IFFT operating unit 507 places the data for the narrow-band terminal at a part corresponding to the size of narrow-band IFFT and generates and inserts a guard band to the remaining parts.

If the first frequency band and the second frequency band are not continuous, the IFFT operating unit 507 employs narrow-band IFFT operating units which inverse fast-Fourier-transform the transmit signals by each frequency band. In this case, the number of the narrow-band IFFT operating units is the same as that of the frequency bands supplied to the terminals.

The RF processor 509 converts a base-band signal supplied from the IFFT operating unit 507 into an RF signal and then transmits it to an external via an antenna.

A transmission apparatus of the base station was described in the above embodiment. As another embodiment, a reception apparatus (not shown) of the base station receives a signal through the first and second frequency bands according to the resource allocation information transmitted to the terminals.

A description will now be made on a block configuration of a terminal for performing a communication using the frame of FIG. 1 in the wide-band wireless communication system.

Figure 6:
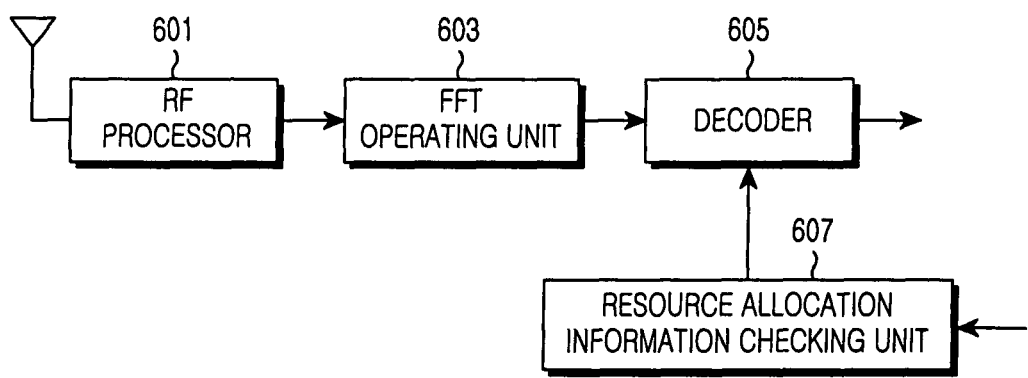
FIG. 6 is a block diagram illustrating a configuration of a terminal in the wide-band wireless communication system according to the present invention.

FIG. 6 is a block diagram illustrating a configuration of the terminal in the wide-band wireless communication system according to the present invention.

As shown in FIG. 6, the terminal has an RF processor 601, an FFT operating unit 603, a decoder 605 and a resource allocation information checking unit 607.

First, the RF processor 601 converts an RF signal received via an antenna into a base-band signal and then outputs it.

The FFT operating unit 603 fast-Fourier-transforms a time zone signal supplied from the RF processor 601 into a frequency zone signal.

The decoder 605 demodulates and decodes the signal supplied from the FFT operating unit 603 to a corresponding MCS level to restore data. In this case, the decoder 605 demodulates and decodes only the signal of the zone allocated thereto according to the resource allocation information supplied from the resource allocation information checking unit 607. For example, in the case of the narrow-band terminal, the decoder 605 demodulates and decodes the signal based on the resource allocation information of the first frequency band supplied from the resource allocation information checking unit 607.

In addition, in the case of the wide-band terminal, the decoder 605 demodulates and decodes the signal based on the resource allocation information of the first frequency band or the second frequency band supplied from the resource allocation information checking unit 607.

The resource allocation information checking unit 607 supplies to the decoder 605, the resource allocation information of the terminal which was checked using the first control information or the second control information contained in a receiving signal. For example, in the case of the narrow-band terminal, the resource allocation information checking unit 607 checks the resource information allocated from the base station, from the first control information contained in the first frequency band.

In the case of the wide-band terminal, the resource allocation information checking unit 607 checks the frequency band (for example, the second frequency band) including the second control information from the wide-band pointer of the first frequency band. And then, the resource allocation information checking unit 607 checks the resource information allocated from the base station, from the second control information contained in the second frequency band.

In the above embodiment, the terminal can receive the signals of the first and second frequency bands simultaneously using one receiving end, since the first frequency band and the second frequency band are continuously adjacent. Here, the narrow-band terminal receives only the signal of the first frequency band.

If the first frequency band and the second frequency band are not continuous, the wide-band terminal may be structured to have at least one receiving end (for example, RF processor or FFT operating unit) for receiving signals by each frequency band.

The reception apparatus of the terminal was described in the above embodiment. As another embodiment, a transmission apparatus (not shown) of the terminal transmits a signal via the antenna using the resource of the first frequency band or the second frequency band by use of the resource allocation information which was checked in the resource allocation information checking unit 607. Here, the transmitting end includes an encoder, a sub-channel matching unit, an IFFT operating unit and an RF processor.

As described above, by performing a communication using the frame structure for maintaining the backward compatibility with the narrow-band wireless communication system which employs one frequency band in the wide-band wireless communication system which employs at least two frequency bands, the present invention can reduce the overhead due to the control information and maintain the backward compatibility with the narrow-band wireless communication system, thereby providing services to the terminal of the typical narrow-band wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a base station in a wireless communication system using at least two frequency bands, the method comprising:

generating first control information including a resource allocation information for a narrow-band terminal;

generating second control information including a resource allocation information for a wide-band terminal; generating a pointer including information regarding a frequency band that contains the second control information for the wide-band terminal;

generating a first frame of a first frequency band including the first control information and the pointer; and generating a second frame of a second frequency band including the second control information, wherein the narrow-band terminal uses the first frequency band and the wide-band terminal uses the first frequency band and the second frequency band, wherein the first frame includes a synchronous channel, common control information, the first control information, the pointer, and a burst zone, wherein the common control information includes a length of frame, an uplink ratio, a downlink ratio, a Transmit/Receive Transition Gap value, a Receive/Transmit Transition Gap value, and a cyclic prefix length, which are commonly applied to the terminals.

2. The operating method of claim 1, wherein the second frequency band is any one of the frequency bands except the first frequency band among the frequency bands used in the wide-band wireless communication system.

3. The operating method of claim 1, wherein the first frequency band and the second frequency band are continuous or discontinuous.

4. The operating method of claim 1, wherein the burst zone includes a burst zone allocated to narrow-band terminals and a burst zone allocated to wide-band terminals.

5. The operating method of claim 4, wherein the burst zone allocated to the narrow-band terminals and the burst zone allocated to the wide-band terminals are divided by a frequency division multiplexing method or a time division multiplexing method.

6. The operating method of claim 1, further comprising:
transmitting the generated first frame and second frame to the terminals providing services.

7. The operating method of claim 1, wherein the resource allocation information for the wide-band terminal includes information regarding resources allocated in the first frequency band and in the second frequency band for the wide-band terminal.

8. An operating method of a wide-band terminal in a wireless communication system using at least two frequency bands, the method comprising:
receiving a first frame including a pointer through a first frequency band; determining a second frequency band containing a second control information based on the pointer; and
receiving data information allocated in a second frame based on the second control information through the second frequency band,
wherein the second control information includes a resource allocation information for the wide-band terminal, and
wherein the wide-band terminal uses the first frequency band and the second frequency band,
wherein the first frame includes a synchronous channel, common control information, the first control information, the pointer, and a burst zone,
wherein the common control information includes a length of frame, an uplink ratio, a downlink ratio, a Transmit/Receive Transition Gap value, a Receive/Transmit Transition Gap value, and a cyclic prefix length, which are commonly applied to the terminals.

9. The operating method of claim 8, wherein the second frequency band is any one of the frequency bands except the first frequency band among the frequency bands used in the wide-band wireless communication system.

10. The operating method of claim 9, further comprising:
if a resource of the first frequency band is allocated to the terminals according to the second control information, performing a communication using the resource of the first frequency band; and
if a resource of the second frequency band is allocated to the terminals according to the second control information, performing a communication using the resource of the second frequency band.

11. The operating method of claim 10, wherein if the resource of the first frequency band is allocated to the wide-band terminals, a burst zone allocated to the narrow-band terminals and a burst zone allocated to the wide-band terminals are divided by a frequency division multiplexing method or a time division multiplexing method.

12. The operating method of claim 8, wherein the first frequency band and the second frequency band are continuous or discontinuous.

13. The operating method of claim 8, wherein the resource allocation information for the wide-band terminal includes information regarding resources allocated in the first frequency band and in the second frequency band for the wide-band terminal.

14. A base station of a wireless communication system using at least two frequency bands, the base station comprising:
a scheduler configured to allocate resource of the frequency bands to terminals providing services;
a control information generator configured to generate first control information including a resource allocation information for a narrow-band terminal, second control information including a resource allocation information for a wide-band terminal, and a pointer including information regarding a frequency band that contains the second control information for the wide-band terminal; and
a resource mapping unit configured to map the first control information and pointer to a first frame of a first frequency band, and map the second control information to a second frame of a second frequency band;
wherein the narrow-band terminal uses the first frequency band and the wide-band terminal uses the first frequency band and the second frequency band,
wherein the first frame includes a synchronous channel, common control information, the first control information, the pointer, and a burst zone,
wherein the common control information includes a length of frame, an uplink ratio, a downlink ratio, a Transmit/Receive Transition Gap value, a Receive/Transmit Transition Gap value, and a cyclic prefix length, which are commonly applied to the terminals.

15. The base station of claim 14, wherein the scheduler is configured to allocate the resource for the narrow-band terminals in the first frequency band, and the resource for the wide-band terminals in the frequency bands, and select the second frequency band which is to include the second resource allocation information among the frequency bands.

16. The base station of claim 15, wherein the scheduler is configured to select the second frequency band which is continuous or discontinuous to the first frequency band.

17. The base station of claim 14, wherein the resource mapping unit is configured to map data on the narrow-band terminals to the resource of the first frequency band according to the resource allocation information, and map data on the wide-band terminals to the resource of the frequency bands according to the resource allocation information.

18. The base station of claim 14, wherein in the case that the resource mapping unit maps data which are to be transmitted to narrow-band terminals and to wide-band terminals, to the resource of the first frequency band, a zone allocated to the narrow-band terminals and a zone allocated to the wide-band terminals are divided by a frequency division multiplexing method or a time division multiplexing method.

19. The base station of claim 14, further comprising:
a transmitter configured to transmit the resource mapped signal,
wherein the transmitter includes an Orthogonal Frequency Division Multiplexing modulator configured to inverse fast-Fourier-transform a signal supplied from the resource mapping unit; and an RF processor configured to modulate the inverse fast-Fourier-transformed signal into a radio frequency (RF) signal and transmit the RF signal via an antenna.

20. The base station of claim 14, wherein the resource allocation information for the wide-band terminal includes information regarding resources allocated in the first frequency band and in the second frequency band for the wide-band terminal.

21. A wide-band terminal of a wireless communication system using at least two frequency bands, the terminal comprising:
  a receiver configured to receive a first frame including a pointer through a first frequency band;
  a resource allocation information checking unit configured to determine a second frequency band containing a second control information based on the pointer,
  wherein the receiver receives data information allocated in a second frame based on the second control information through the second frequency band,
  wherein the second control information includes a resource allocation information for the wide-band terminal, and
  wherein the wide-band terminal uses the first frequency band and the second frequency band,
  wherein the first frame includes a synchronous channel, common control information, the first control information, the pointer, and a burst zone,
  wherein the common control information includes a length of frame, an uplink ratio, a downlink ratio, a Transmit/Receive Transition Gap value, a Receive/Transmit Transition Gap value, and a cyclic prefix length, which are commonly applied to the terminals.

22. The wide-band terminal of claim 21, wherein the resource allocation information determines the second frequency band containing the second control information and determines the resource allocation information for the wide-band terminal from the second frequency band.

23. The wide-band terminal of claim 21, wherein the receiver includes:
  a radio frequency (RF) processor configured to convert an RF signal received via an antenna into a base-band signal;
  an Orthogonal Frequency Division Multiplexing (OFDM) demodulator configured to fast-Fourier-transform the base-band signal; and
  a decoder configured to demodulate and decode only a corresponding signal from the fast-Fourier-transformed signal according to a common control information and resource allocation information of a narrow-band terminal.

24. The wide-band terminal of claim 21, further comprising:
  a transmitter configured to transmit a signal according to the second control information, wherein the transmitter includes:
  an encoder configured to encode and modulate data to be transmitted according to a corresponding modulation and coding scheme (MCS) level;
  a resource mapping unit configured to map the encoded and modulated data to a corresponding resource according to the common control information and resource allocation information;
  an Orthogonal Frequency Division Multiplexing (OFDM) modulator configured to inverse fast-Fourier-transform the signal mapped to the resource; and
  a radio frequency (RF) processor configured to modulate the inverse-fast-Fourier-transformed signal into an RF signal and transmit the RF signal via an antenna.

25. The wide-band terminal of claim 21, wherein the resource allocation information for the wide-band terminal includes information regarding resources allocated in the first frequency band and in the second frequency band for the wide-band terminal.

* * * * *